United States Patent [19]
Ford

[11] Patent Number: 4,838,569
[45] Date of Patent: Jun. 13, 1989

[54] BICYCLE

[76] Inventor: Thomas R. Ford, 143 Whims La., Rochester, Mich. 48064

[21] Appl. No.: 185,480

[22] Filed: Apr. 25, 1988

[51] Int. Cl.⁴ .................................................. B62K 3/04
[52] U.S. Cl. .................................... 280/275; 280/288.3
[58] Field of Search .......... 280/275, 283, 284, 281 R, 280/278, 227

[56] References Cited

U.S. PATENT DOCUMENTS

| | | | |
|---|---|---|---|
| 433,172 | 7/1890 | Jett | 280/275 |
| 578,326 | 3/1897 | Fox | 280/227 |
| 603,006 | 4/1898 | Demarest | 280/275 |
| 645,474 | 3/1900 | Kiefer | 280/275 |
| 1,114,855 | 10/1914 | Buckland | 280/275 |
| 1,580,414 | 4/1926 | Cozzolino et al. | 280/275 |
| 1,668,784 | 5/1928 | Savage | 280/275 |
| 2,264,981 | 12/1941 | Jencick | 280/283 |
| 4,129,317 | 12/1978 | Bell | 280/275 |
| 4,493,749 | 1/1985 | Brezina | 280/281 R |
| 4,657,295 | 4/1987 | Foret | 280/281 R |

FOREIGN PATENT DOCUMENTS

| | | |
|---|---|---|
| 0194159 | 9/1986 | European Pat. Off. |
| 437092 | 10/1947 | Italy |
| 69895 | 4/1952 | Netherlands |
| 18274 | 10/1896 | United Kingdom |

Primary Examiner—Charles A. Marmor
Assistant Examiner—Donn McGiehan
Attorney, Agent, or Firm—Gifford, Groh, Sheridan, Sprinkle and Dolgorukov

[57] ABSTRACT

A bicycle constructed with a one piece frame of resilient material which acts as a leaf spring, flexing to absorb varying road and riding conditions. A modular seat post-pedal bearing assembly is adjustable vertically to suit the rider and ground clearance requirements.

20 Claims, 3 Drawing Sheets

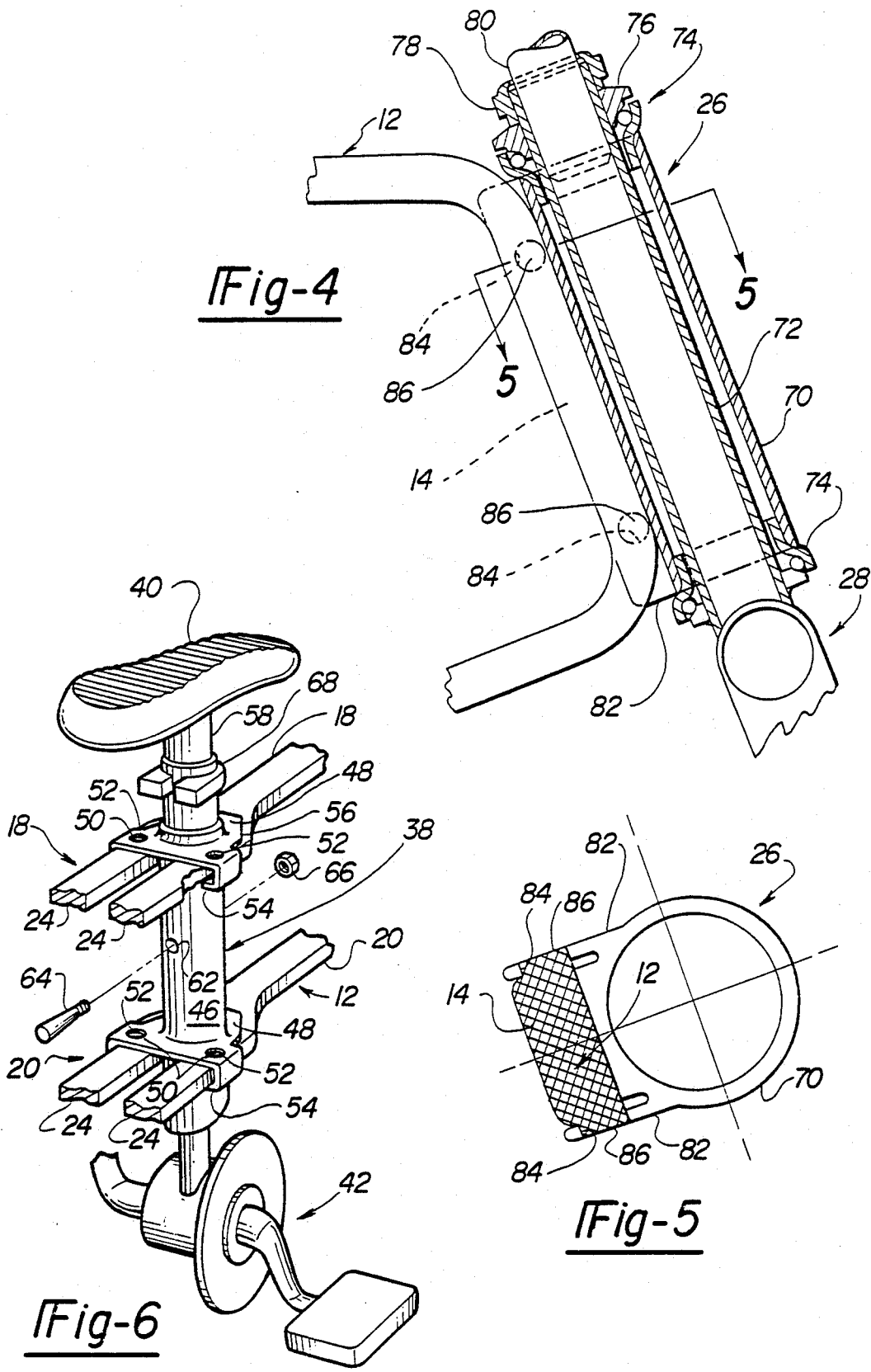

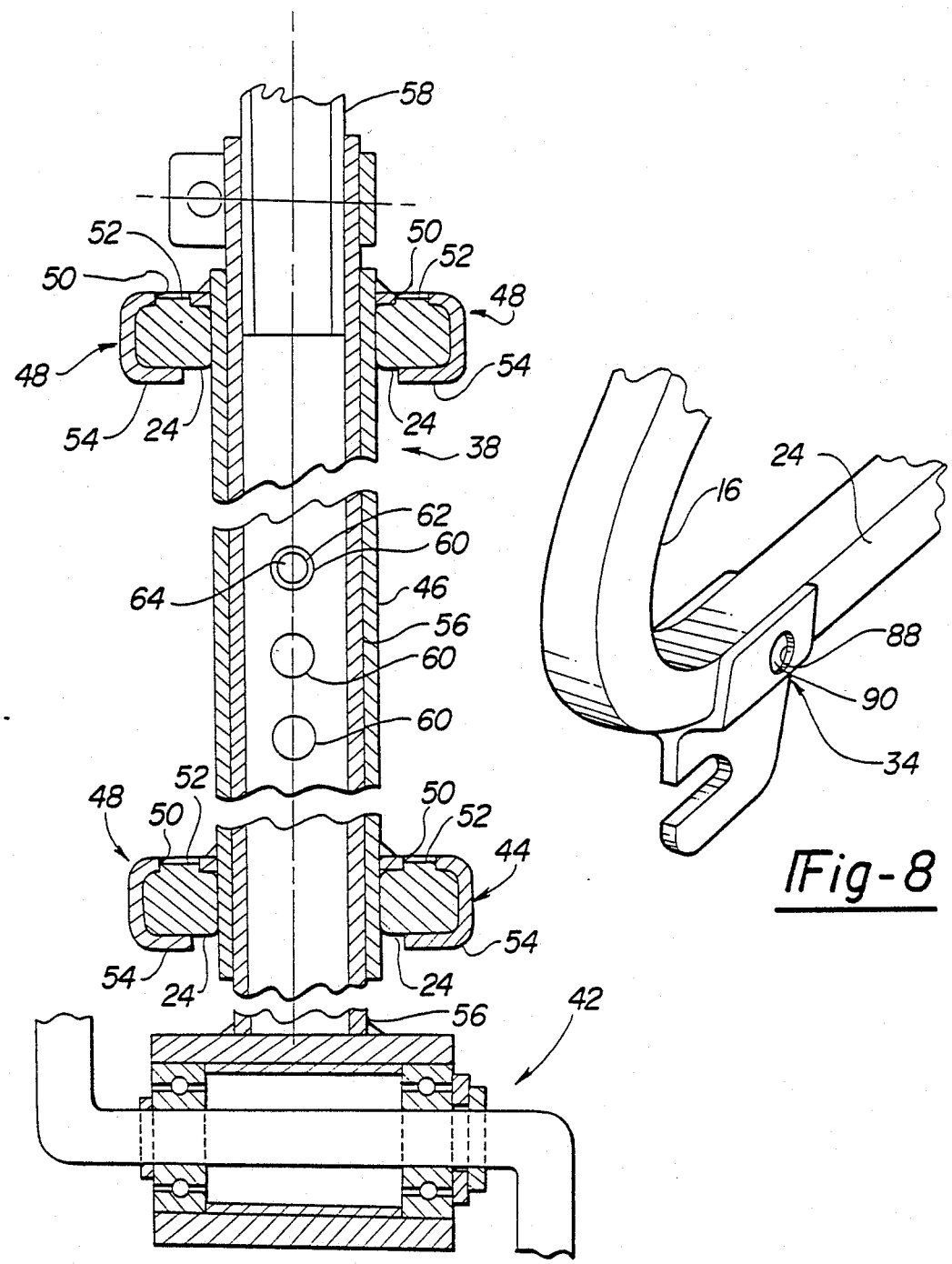

BICYCLE

BACKGROUND OF THE INVENTION

1. Field of the Invention:

This invention relates to bicycles, and more particularly, it relates to a unique frame structure and a modular seat post-pedal assembly attached to the frame.

2. Description of the Prior Art:

Bicycles are commonly constructed with a rigid frame to which is mounted front and rear wheel assemblies and an associated drive which usually takes the form of a pedal actuated chain and sprocket, drive. Rider comfort for varying road conditions commonly is accomodated by the use of shock absorbers or spring suspension in front wheel mounting and spring isolation of the seat.

A variety of designs have been advanced to isolate the rider from the shock of road conditions by building the frame with parts of the frame designed to absorb the shock. For example, bicycles have been build where the upper and lower longitudinal portions of the frame take the form of leaf springs with rigid struts therebetween. Others use a combination of a rigid longitudinal member with a spring member either above or below the rigid frame member. Still another utilizes a single rigid member with a central leaf spring section.

Often the frame is so configured to delineate the bicycle as man's bicycle by having a top bar or a lady's bicycle by having a drop frame to accomodate the skirt of the rider. An early bicycle featured a frame made from a single piece of wood which was slit and formed in such a way that individual portions could be bent to form the top, bottom and central portions in either a man's or a lady's style. This structure reduced the number of joints used but required a number of brackets and plates to obtain sufficient rigidity for structrual integrity. No consideration was given in this design to absorbing the road bed created shocks.

Other designs have evolved to simplify the frame structure including one involving bending lengths of tubular material to form a pair or identical or mirror image side frames. This reduces the number of weldments or special shaping of the tubing which is common, but again no consideration was given in this design to absorbing road shocks. Frames have even been constructed from a single piece of heavy steel wire which is bent to form the various straight and curved runs of the frame including partial and complete loops for connection of the bicycle components. Like the wood frame referred to above, the major problem encountered in attempting to make a single piece structure is the designing and application of clips and other braces to obtain sufficient rigidity to be structurally sound; no consideration being given to absorbing road bed created shocks.

SUMMARY OF THE INVENTION

The present invention provides a bicycle with a one piece resilient frame designed to absorb road shocks and to present an asthetically pleasing appearance. The frame is constructed with a generally elliptical configuration with the forward end having a planar portion for engaging a steering pivot and a rearward end. The frame is bifurcated from a point intermediate its ends to the rearward end so as to define upper and lower longitudinally extending portions each being bifurcated from the intermediate point rearward.

The frame has substantially uniform cross-sections both in the portion forward of the intermediate point and in the bifurcated portions rearward of the intermediate point and the cross-sections are so proportioned to provide more lateral stiffness than vertical stiffness. Preferably the cross-sections are generally rectangular with a greater width than height both in the uninterrupted forward portion and in the rearward bifurcated portions.

The frame is formed as a wound fiber and plastic composite which is molded into the generally elliptical shape which allows it to act as a leaf spring flexing in its two longitudinally extending portions to absorb varying road and riding conditions.

A steering pivot is mounted to the planer portion of the frame and contains a front wheel fork assembly and a handle bar. A modular seat post-pedal assembly is mounted to the bifurcated portion of the frame adjacent the intermediate point and extends between the upper and lower longitudinally extending frame portions.

The modular seat post-pedal assembly is designed to be adjustable vertically to suit the rider and ground clearance requirements. This feature is not available in prior art structures. This allows adjustment for the particular terrain to be encountered.

The modular seat post assembly includes a center tube with brackets located to mount the center tube to the bifurcated portions of the upper and lower longitudinally extending frame portions. Each bracket has oppositely directed ears which wrap around the bifurcated frame portions. A pedal post extends through the center tube having a pedal assembly affixed at one end which extends below the lower longitudinally extending frame portion and a seat stem affixed to the other end which extends above the upper longitudinally extending frame portion. The pedal post is slidable in the center tube to obtain the vertical adjustment. The seat post is secured to the center tube in a preselected position by a tapered bolt and nut assembly.

Rear wheel mounting brackets are attached to each bifurcated lower longitudinally extending portion of the frame adjacent the rearward end thereof.

The frame is formed with a plurality of bosses which engaged apertures in the steering pivot, rear wheel mounting brackets and the vertically adjustable modular seat post-pedal assembly to position them on the frame and retain them against movement. Additionally, the steering pivot, modular seal post-pedal assembly, and rear wheel mounting brackets are adhesively bonded to the frame.

The foregoing advantages and other will become more apparent from the following description and the accompanying drawings.

BRIEF DESCRIPTION OF THE DRAWING

FIG. 4 is a partial sectional view taken alone line 4—4 of FIG. 2 showing the details of my steering pivot;

FIG. 5 is a cross sectional view taken along line 5—5 of FIG. 4 showing the attachment of the steering pivot to the frame;

FIG. 6 is a perspective view of my modular seat post-pedal assembly showing its attachment to the frame;

FIG. 7 is a sectional elevational view along line 7—7 of FIG. 2 showing the modular seat post-pedal assembly and its attachment to the frame with a center tube having end flanges, and showing the pedal assembly and seat stem attachment to the center tube; and FIG. 8 is a partial perspective view showing one of the rear wheel mounting brackets and its attachment to the frame.

DETAILED DESCRIPTION OF THE PREFERRED EMBODIMENTS OF THE INVENTION

Figure 1:
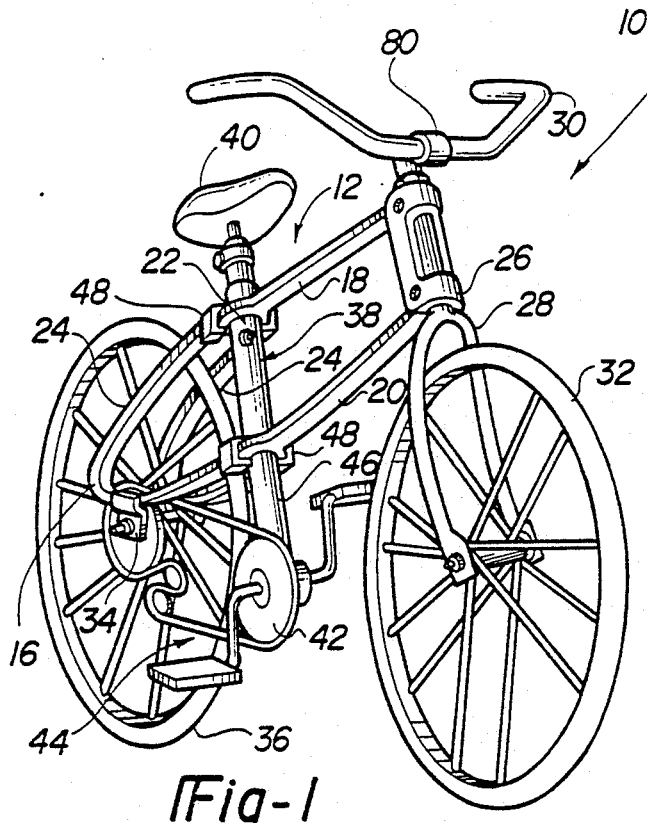
FIG. 1 is a perspective view of a bicycle incorporating the elements of the invention.
Figure 3:
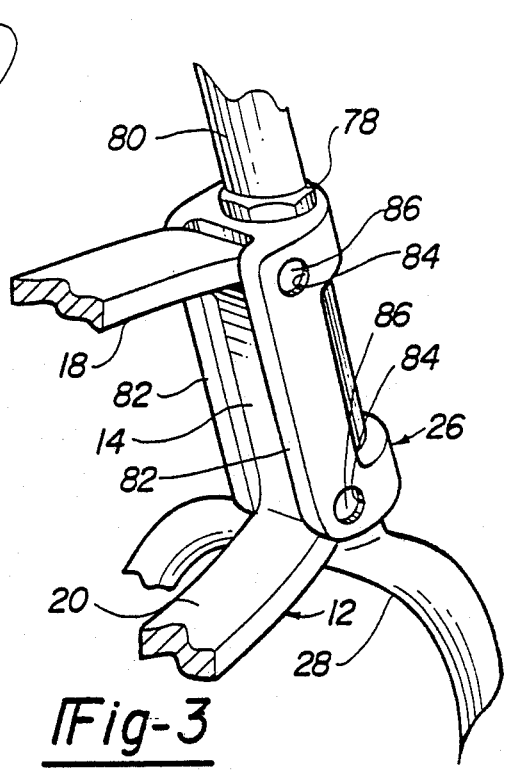
FIG. 3 is a partial perspective view of the steering pivot of my invention showing its attachment to the frame and showing the handle bar and front wheel fork assembly attachment to the steering pivot.
Figure 2:
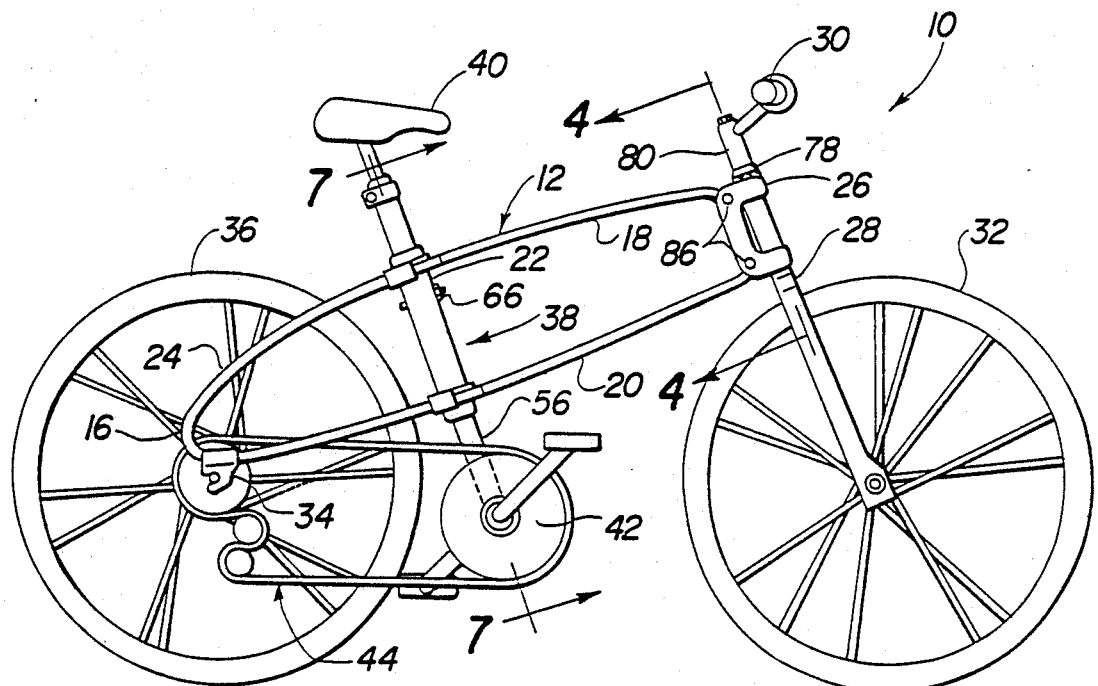
FIG. 2 is a side elevational view of a bicycle of the invention.

As seen in FIGS. 1-3, bicycle 10 has a generally elliptical one piece frame 12. Frame 12 has a forward planar end 14 and a rearward end 16 with upper and lower longitudinally extending portions 18 and 20. The frame is bifurcated at an intermediate point 22, having identical rearwardly extending bifurcated portions 24.

Steering pivot 26 is mounted to the forward planer end 14 of frame 12 to carry a conventional front wheel fork assembly 28 and handle bar 30. Front wheel 32 is mounted to the fork assembly 28 in a conventional manner.

Rear wheel mounting brackets 34 are attached to each lower longitudinally extending portion 20 the bifurcated frame portion 24. Rear wheel 36 is mounted in a conventional manner between these brackets 34.

Modular seat post-pedal assembly 38 is mounted between upper and lower bifurcated frame portions 24, abutting point 22 at which the frame separates. Assembly 38 carries seat 40 at one end and pedal assembly 42 at the other end. A conventional chain drive 44 is supplied between rear wheel 36 and pedal assembly 42.

As best seen in FIGS. 3, 5, 6 and 7, the generally elliptical frame has a substantially rectangular cross section with slightly rounded corners. The width is greater than the vertical height to provide greater lateral stiffness than vertical stiffness which will allow the frame as a whole to absorb the road encountered bumps or shocks. As seen in FIGS. 3, 5 and 6, the forward, undivided portion of the frame may have a width of up to three of four times the height, but generally this width would be closer to twice the height, depending on the material used. As shown in FIG. 6, the width of the bifurcated portion of the frame could be twice the heigth, but as shown in FIG. 7 it is more often no more than one and one half times the height. While the generally rectangular cross section is preferred and shown, the cross section could take another shape such as being elliptical.

While a wide variety of materials could be used, I prefer to use a wound fiber and plastic composite which presents a good combination of strength and resiliency.

As best seen in FIGS. 6 and 7, the modular seat post-pedal assembly 38 includes a center tube 46 with mounting brackets 48 welded thereto spaced for assembly to the bifurcated portions 24 of the upper and lower frame portions 18 and 20, respectively. Mounting brackets 48 have apertures 50 for receiving bosses 52 which are integrally molded with the bifurcated portions 24 of the frame to thereby locate the center tube relative to the frame. In assembly, an adhesive such as an epoxy is applied to the frame and brackets and the frame bosses 52 are snapped into the bracket apertures 50. The laterally extending ear portions 54 of brackets 48 are then rolled inwardly as shown completely embracing the bifurcated frame portions 24. A pedal-post 56 receives the pedal assembly 42 at one end and slides within and through the center tube 46 to receive a seat stem 58 at its other end. The pedal-post can be slid to provide vertical adjustment to control the ground clearnace of the pedal assembly 42. A number of through holes 60 are provided in a pedal-post 56, one of which is selected to be aligned with holes 62 in center tube 46 to receive tapered bolt 64 and securing nut 66. The heigth of seat 40 can be adjusted by loosening conventional clamp 68 independent of the vertical positioning of the entire seat post-pedal assembly 38.

As best seen in FIGS. 3, 4 and 5, steering pivot 26 has an open front tubular portion 70 which receives fork tube 72 for steering rotation. Ball bearings 74 are used at each end of steering pivot 26 with the inner race 76 of upper roller bearing 74 being threaded onto the end of fork tube 72 and being further secured by jam nut 78. The stem of a conventional adjustable handle bar goose neck 80 extends into fork tube 72. Steering pivot 26 has a pair of rearwardly extending wings 82, each having a pair of spaced mounting holes 84 for receiving spaced bosses 86 on the sides of planar frame portion 14. This locates the steering pivot 26 relative to the frame 12. In assembly, an epoxy cement is applied to the planar frame portion 14 and steering pivot 26, and bosses 86 on the frame are snapped into the mounting holes 84 of the steering pivot.

The rear wheel mounting brackets 34 are affixed to the lower bifurcated frame portions 24 in a manner similar to the attachment of the steering pivot and the modular seat post-pedal assembly to the frame. Namely, bracket 34 is provided with cross holes 88 which receive frame bosses 90 to position the brackets on the frame. In assembly, an epoxy is applied to the bracket and the frame and the bosses 90 are snapped into the cross holes 88.

Other means such as conventional hardware could be used for mounting the working elements to the frame. For example, bolts passing through the frame could be used for attaching the rear wheel mounting brackets and the front pivot to the frame. Collars and set screws could be used on center tube 46 on each side the upper and lower bifurcated frame portions to adjustably mount the modular seat post-pedal assembly to the frame. The preferred snap-in boss, adhesive bond presents a stronger and more eye pleasing appearance.

The embodiments of the invention in which an exclusive property ro privilage is claimed are defined as follows:

1. A bicycle comprising, in combination:
   a generally elliptical resilient frame formed as a single continuous member from a wound fiber and plastic composite acting as a spring flexing to absorb varying road and riding conditions, said frame having forward and rearward ends and being laterally bifurcated from a point intermediate its ends to said rearward end so as to define upper and lower longitudinally extending portions each being bifurcated from said intermediate point rearward;
   a steering pivot located at the forward end of said frame for mounting a front wheel fork assembly and handle bar; and a modular seat post-pedal assembly mounted to said laterally bifurcated portion of said frame adjacent said intermediate point and extending between and above and below said upper and lower longitudinally extending frame portions.

2. The bicycle according to claim 1 wherein said modular seat post-pedal assembly is adjustable vertically to suit rider and ground clearance requirements.

3. The bicycle according to claim 2 wherein said modular seat post-pedal assembly includes a center tube with brackets spaced for mounting the tube to the bifurcated portions of said upper and lower longitudinally extending frame portion.

4. The bicycle according to claim 3 wherein said modular seat post-pedal assembly further includes a pedal post extending through said center tube having a pedal assembly affixed at one end which extends below said lower longitudinally extending frame portion and a seat stem affixed at the other end which extends above the upper longitudinally extending frame portion, said pedal post being slidable in said center tube for vertical adjustment of said seat post-pedal assembly and being secured thereto in a preselected position.

5. The bicycle according to claim 4 wherein said seat post is tubular and is secured to said center tube by a tapered bolt and nut assembly.

6. The bicycle according to claim 3 wherein the bifurcated portion of said upper and lower frame portions have raised bosses which are received in apertures in said brackets for mounting said modular seat post-pedal assembly to said frame.

7. The bicycle according to claim 6 wherein said brackets are adhesively bonded to said frame.

8. The bicycle according to claim 7 wherein said brackets have ears which are rolled inwardly toward said center tube in a U-shape embracing upper and lower surfaces of said bifurcated frame portions.

9. The bicycle according to claim 1 wherein said frame has a planar portion at its forward end for engaging a recess in said steering pivot.

10. The bicycle according to claim 9 wherein said frame has upper and lower bosses which engage apertures in wall means forming said steering pivot recess.

11. The bicycle according to claim 10 wherein said steering pivot is adhesively bonded to the planar portion said frame.

12. The bicycle according to claim 1 further including rear wheel mounting brackets attached to each bifurcated lower longitudinally extending portion of said frame adjacent the rearward end thereof.

13. The bicycle according to claim 12 wherein the bifurcated lower longitudinally extending portions of said frame have bosses which engage apertures in said rear wheel mounting brackets.

14. The bicycle according to claim 13 wherein said rear wheel mounting brackets are adhesively bonded to the bifurcated lower longitudinally extending portions of said frame.

15. The bicycle according to claim 1 wherein said frame has a substantially uniform cross-section both in the portion from the intermediate point to the forward end and in the bifurcated portion from the intermediate point to the rearward end which are so proportioned to provide more lateral stiffness than vertical stiffness.

16. The bicycle according to claim 15 wherein said frame has a generally rectangular cross-section with its width being greater than the height both in the upper and lower longitudinally extending portions from the intermediate point to the forward end and in the bifucated portions.

17. A bicycle comprising, in combination:

a generally elliptical resilient frame formed as a single continuous member from a wound fiber and plastic composite acting as a spring flexing to absorb varying road and riding conditions, said frame having forward and rearward ends and being laterally bifurcated from a point intermediate its ends to said rearward end so as to define upper and lower longitudinally extending portions each being bifurcated from said intermediate point rearward;

a steering pivot located at the forward end of said frame for mounting a front wheel fork assembly and handle bar;

a pair of rear wheel mounting brackets, one attached to each bifurcated lower longitudinally extending portion of said frame adjacent the rearward end thereof;

a vertically adjustable modular seat post-pedal assembly located between said bifurcated portions of said frame adjacent said intermediate point and extending between said upper and lower longitudinally extending frame portions and including:

a center tube with brackets adjacent each end mounting the tube to the laterally bifurcated portions of said upper and lower longitudinally extending frame portions;

a pedal post extending through and slidable within said center tube, above and below said upper and lower longitudinally extending frame portions;

a pedal assembly affixed at one end of said pedal post which extends below said lower longitudinally extending frame portion;

a seat stem affixed to the other end of said pedal post which extends above the upper longitudinally extending frame portion;

and means extending transversely through said center tube and pedal post securing them together in a preselected position.

18. The bicycle according to claim 17 wherein the means securing said pedal post and center tube together in a preselected position includes a tapered bolt and nut.

19. The bicycle according to claim 17 wherein said steering pivot, said rear wheel mounting brackets, and said modular seat post-pedal assembly are adhesively bonded to said frame.

20. The bicycle comprising, in combination:

a generally elliptical resilient frame having forward and rearward end and being bifurcated from a point intermediate its ends to said rearward ends so as to define upper and lower longitudinally extending portions each being bifurcated from said intermediate point rearward, said frame further having a planar portion at its forward end and a plurality of bosses for locating and mounting components thereto;

a steering pivot having a plurality of apertures receiving certain of said bosses for attachment to the planar portion of said frame, said steering pivot mounting a front wheel fork assembly and handle bar;

a pair of rear wheel mounting brackets having a plurality of apertures receiving certain of said bosses for attachment to each birfurcated lower longitudinally extending portion of said frame adjacent the rearward end thereof; and a modular seat post-pedal assembly having a plurality of apertures for receiving certain of said bosses for attachment to said bifurcated portion of said frame adjacent said intermediate point and extending between said upper and lower longitudinal extending frame portions.

* * * * *